United States Patent [19]

Baines

[11] Patent Number: 4,539,705
[45] Date of Patent: Sep. 3, 1985

[54] BAG WITH CARRYING HANDLE

[75] Inventor: Patrick A. Baines, Charlotte, N.C.

[73] Assignee: Venture Packaging, Inc., Charlotte, N.C.

[21] Appl. No.: 612,248

[22] Filed: May 21, 1984

Related U.S. Application Data

[63] Continuation-in-part of Ser. No. 487,197, Apr. 21, 1983, abandoned.

[51] Int. Cl.³ .............................................. B65D 30/00
[52] U.S. Cl. .......................................... 383/8; 383/21; 383/120; 383/28
[58] Field of Search ......................... 383/21, 120, 8, 28

[56] References Cited

U.S. PATENT DOCUMENTS

| | | | |
|---|---|---|---|
| 1,808,375 | 6/1931 | Plooster | 383/8 |
| 3,078,895 | 2/1963 | Silver | 383/120 X |
| 3,370,630 | 2/1968 | Haugh et al. | 338/120 X |
| 4,252,269 | 2/1981 | Peppiatt | 383/21 X |

FOREIGN PATENT DOCUMENTS 1022595  3/1966  United Kingdom .................. 383/28

Primary Examiner—Steven M. Pollard
Attorney, Agent, or Firm—Richards, Shefte & Pinckney

[57] ABSTRACT

A bag formed of a flaccid material for receiving and containing merchandise, the bag being formed by a sheet of such material folded along a fold line to provide two juxtaposed or overlapping generally rectangular wall panels having the side edges thereof joined together, such fold line being tucked inwardly between such overlapping wall panels to form a gusset, and a separate strip of material folded along a fold line extending along the length thereof and disposed within the gusset to extend across the entire width thereof with the fold line of the separate strip of material lying adjacent to the inwardly tucked fold of the sheet of material, the ends of the strip of material being joined to the overlapping portions of the wall panels by a heat seal extending diagonally at a forty-five degree angle across the corners thereof. The separate strip of material may be cut and formed by accessory equipment, and then inserted in the gusset by the same apparatus used to form the gusset in conventional bag forming equipment.

16 Claims, 13 Drawing Figures

BAG WITH CARRYING HANDLE

CROSS-REFERENCE TO RELATED APPLICATIONS

This application is a continuation-in-part of copending U.S. patent application Ser. No. 487,197, filed Apr. 21, 1983, entitled BAG WITH CARRYING HANDLE, now abandoned.

BACKGROUND OF THE INVENTION

The present invention relates to bags formed of thin flaccid material for containing merchandise and the like, and particularly to bags of this type which include handles to facilitate carrying or handling the bag after it has been filled.

It is conventional practice for many manufacturers of various types of merchandise to package such merchandise in bags which can be displayed at the point of purchase, and which permit the buyer to simply pick up and carry away the purchased merchandise. These bags must be inexpensive and lightweight, and they are therefore usually made from a thin plastic material, such as polyethylene. One of the more common types of bags used for this purpose is a simple, single-wall plastic bag folded at the centerline of a length of material and having the two sides sealed together, usually by conventional heat sealing equipment employed during the bag assembly process, to leave an open top so that the merchandise can be loaded into the bag, and these bags may have handles formed by openings cut into the tops of the side wall panels of the bag through which the hand may be inserted to carry the bag. While these openings provide a simple and inexpensive manner of providing a handle, they have the disadvantage of adversely affecting the strength characteristics of the plastic material, and bags of this type are therefore prone to tear during use, particularly if the merchandise contained in the bag is relatively heavy or if the bag is carried for an extended period of time. It is also known, in open-top bags, to provide pull cords made of fabric or heavier plastic which are disposed in reinforced or double-walled slots at the top of the side wall panels, thereby increasing the strength characteristics of the bag while also increasing significantly the costs of producing the bag, and these bags do not enjoy the functional advantages of bags which can be sealed at the top to protect the merchandise carried in the bag. Finally, in bags of this type, separate handle elements of hardened plastic may be secured to the side wall panels, but such separate handles also increase the cost of the bag and may, in some cases, make it more difficult to stack and store bags filled with merchandise because of the projecting presence of the handles.

Some bags are specifically formed to have a rectangular shape which, in some cases, is intended to conform to the rectangular shape of particular merchandise contained therein (e.g. folded diapers, blankets and similar items), and which, in other cases is the result of the bag being filled with a flowable or particulate merchandise) e.g. peat moss, grass seed and the like) that causes the bag to expand to its rectangular shape. In making bags of this type, it is conventional practice to form one end face of the bag with a gusset that permits such end face to readily assume the desired rectangular configuration, thereby providing the bag with a pleasing and neat appearance. In many such bags, the other, or open end of the bag may also be sealed across the flat surface of the merchandise, in which case the end shape of the bag is generally cubic in shape, or such other end is formed to an excessive length so that it can be twisted into a pigtail that can be used to carry the bag. These pigtail-type bags are somewhat difficult to stack because of the uneven bulk of the pigtail, and the pigtail is not a particularly satisfactory handle since it may tend to slip from the hand unless it is grasped firmly, and this problem may be exacerbated by the generally stick texture of the plastic material forming the pigtail and by the weight of a bag containing a large amount of merchandise. Additionally, these pigtail-type bags do not provide the same product integrity that is obtained from bags having a fully sealed end.

In an apparent effort to overcome the disadvantage of pigtail-type bags, some gusset-type bags have been made with separate handle strips. In one form, relatively long strips of plastic are secured directly to the basic bag construction, such as by heat sealing the opposite ends of the handle strip to the outside of the bag at the corners formed by the gusset; or by utilizing a separate, unitary piece of plastic having a rectangular attachment strip and a relatively long handle strip extending across opposite sides of the attachment strip, and the attachment strip is then heat sealed around the periphery of the bag at the gusset with the handle then extending across the midpoint of the rectangular end of the bag when it is filled with merchandise. In both of the aforesaid bags, the handle strips have an extended length so as to provide a relatively large loop through which the hand or arm can be readily inserted when the bag is carried, but this same extended length also creates significant drawbacks. More specifically, the large loops formed by the handles will tend to fall to the side of the bag when it is being stacked or handled in bulk quantities (e.g., when replenishing the supply of full bags on the shelf at a store), and they will therefore tend to become tangled with the handles of other bags or with the hands and arms of the worker engaged in the stacking operation. Also, once stacked, the dangling loops can be unsightly and may be inadvertently engaged by customers and/or equipment (e.g. shopping carts) passing near the stacks of filled bags. Moreover, since these handles are heat sealed or otherwise secured to the exterior portions of the basic bag construction, the bag-forming process may become more complex and significantly increase the cost of producing such bags, and it is usually necessary that the handle be secured to the bag so that it extends across the shorter dimension of the rectangular bag, thereby making it more difficult to carry the bag by its handle since the longer dimension of the bag is directed toward the side of the person carrying the bag and may interfere with the walking movement of such person. Finally, it should be noted that ink cannot normally be impressed onto the surface of a plastic bag in the areas where a heat seal has been formed, and, therefore, bags which have a handle attached thereto by a separate strip heat sealed about the exterior perimeter of the bag will have a reduced exterior surface area on which ink can be applied to the bag to present pictures, printed instructions, and similar copy.

In accordance with the present invention, a container bag is provided which includes a handle that can be readily grasped and held for carrying without presenting the difficulties in known bags having the aforesaid large handle loops, and a unique method for forming the bag is provided which is relatively simple and which adds very little costs to the conventional method of forming gusset-type bags without handles.

SUMMARY OF THE INVENTION

The bag of the present invention is formed of a sheet of flaccid material, such as thin polyethylene, polypropylene, and polyvinylchloride, for example, that is folded along a fold line to provide two juxtaposed panels having adjacent side edges, with the fold line being tucked inwardly between the wall panels to form a gusset. A strip of handle material is folded along a lengthwise fold line and is disposed within the gusset to extend across the width thereof, with the fold line most closely adjacent the inwardly tucked fold line of the flaccid sheet. The side edges of the wall panels are joined to one another, and the side portions of the strip on opposite sides of its fold line are joined at each strip end to the respective adjacent overlapping portions of the wall panels along V-shaped seal lines extending diagonally between the side and top edges of the wall panels. When the bag is filled with merchandise, the wall panels will assume an open disposition having an end panel formed by the gusset and with the strip extending across the end panel and adjacent thereto in an unfolded flattened condition to provide a handle for the bag. This adjacency of the handle to the end panel avoids the problems associated with large, looped handles as discussed above, but the flaccid nature of the bag material and the material of the handle strip nevertheless makes it easy to insert the hand between the end panel and the handle strip when the bag is carried.

Preferably, in forming the bag of the present invention, the handle strip is inserted in the gusset during production of the bag, and the ends of the handle strip are sealed, respectively, to the adjacent wall panels of the bag by a heat seal extending in an angular relation to the extending length of the bag to provide better load distribution and strength when the bag is carried by the handle.

DESCRIPTION OF THE PREFERRED EMBODIMENT

Figure 1:
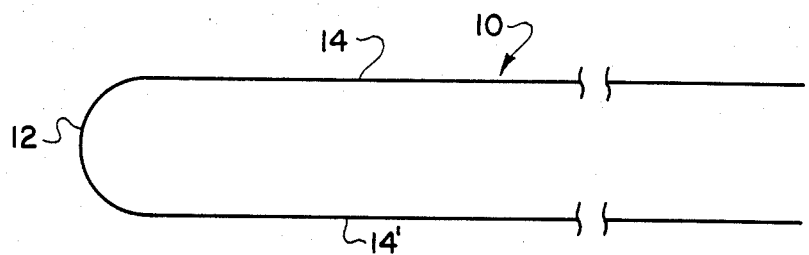
FIGS. 1-4 are side elevational views illustrating diagrammatically, in progression, the steps of forming a bag in accordance with the present invention.
Figure 2:
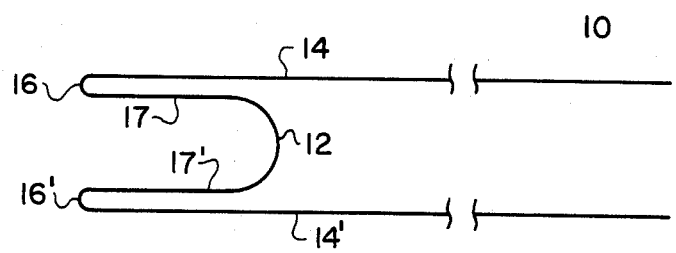
Figure 3:
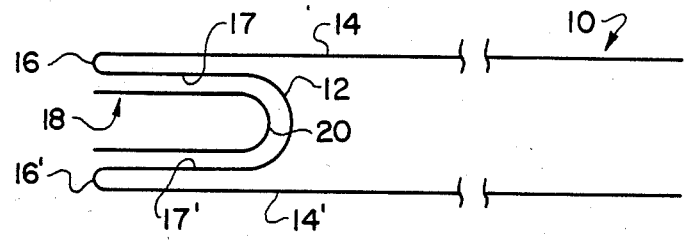
Figure 4:
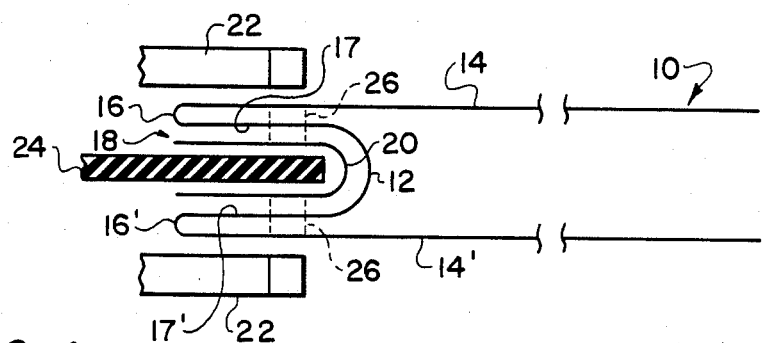
Figure 5:
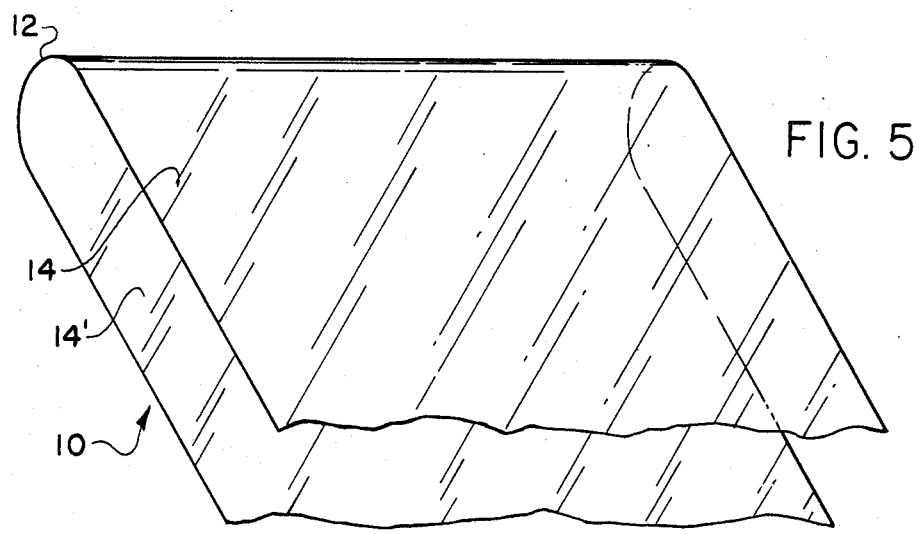
FIGS. 5-7 are perspective views illustrating diagrammatically, in progression, the steps of forming a bag in accordance with the present invention.
Figure 6:
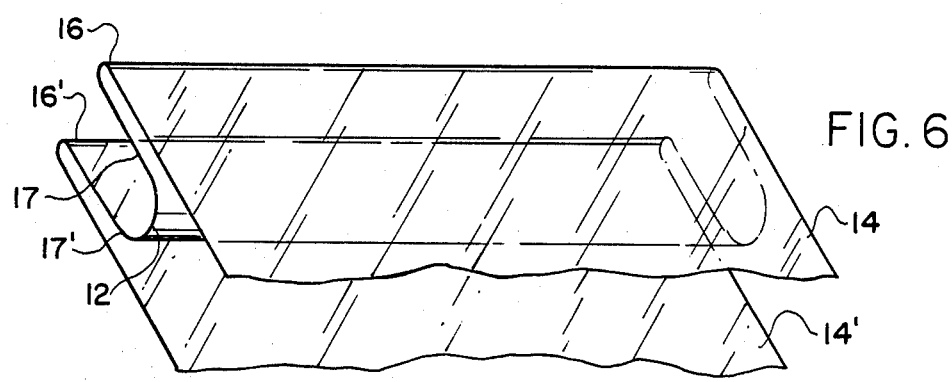
Figure 7:
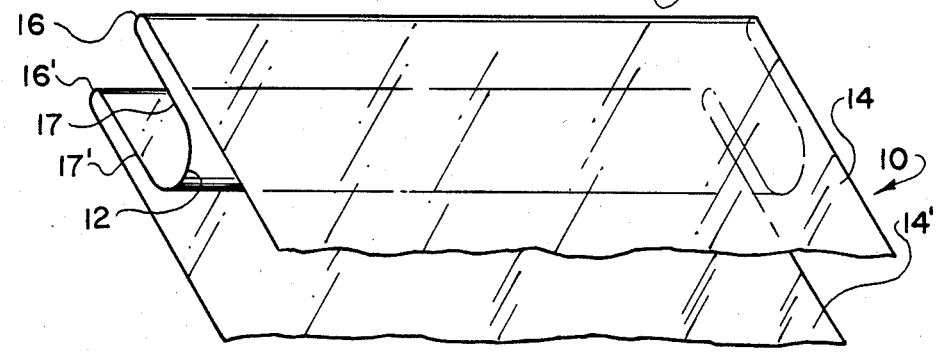

Looking now in greater detail at the accompanying drawings, FIGS. 1-4 illustrate in side elevational views the progressive steps used in forming the bag of the present invention, and FIGS. 5-7 show the same steps as FIGS. 1-3, but in perspective views. It is to be noted that FIGS. 1-7 are presented in diagrammatic form with the various folds of the material being purposely shown in somewhat exaggerated form for clarity of illustration in understanding such steps.

Figure 8:
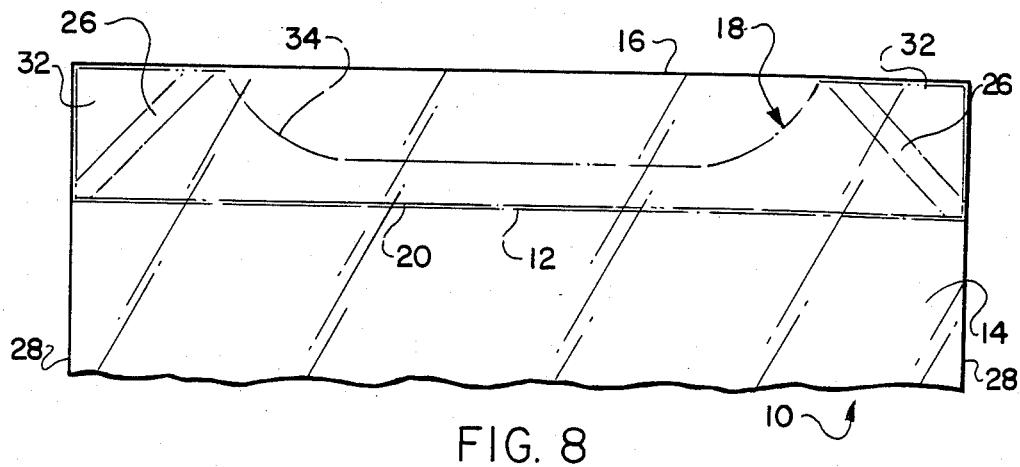
FIG. 8 is a plan view of one end portion of a bag embodying the present invention.

As best seen in FIGS. 1 and 5, the method of forming the bag of the present invention begins by taking a sheet of thin, flaccid material 10, which is preferably a thin sheet of polyethylene or a similar heat-sensitive plastic, and folding it across itself along a first fold line 12 whereby two wall panels 14, 14' are arranged with the major portions thereof lying in an overlapping or juxtaposed relation with the fold line 12 providing a closed edge and with the other ends of the wall panels 14, 14' being unsealed to provide an open bottom edge. Next, as shown in FIGS. 2 and 6, the fold 12 is tucked inwardly between the juxtaposed wall panels 14, 14' along fold lines 16, 16' to form gusset walls 17, 17', the gusset consisting of the four overlapping layers of the sheet of material 10 extending across the width thereof. A separate strip of material 18, which is also preferably made of polyethylene or the like, is provided, and this strip of material 18 has an extending length that is substantially equal to the width of the gusset walls 17, 17' and the wall panels 14, 14', and the strip 18 has a width that is substantially equal to the combined length of the gusset walls 17, 17'. With this configuration of the strip 18, it may be folded along its longitudinally extending centerline at fold line 20, and may then be inserted into the gusset as shown in FIGS. 3 and 7 with the fold line 20 being disposed adjacent the fold line 12 within the gusset (FIG. 3) and with the strip 18 extending across the entire width of the gusset so that the respective longitudinal endwise edges of the strip 18 are disposed adjacent to the side edges of gusset walls 17, 17'. Once the strip 18 has been properly inserted in the gusset as described, the overlapping gusset walls 17, 17', the ends of the wall panels 14, 14' and the strip 18 are joined together, preferably by conventional heating sealing equipment shown diagrammatically in FIG. 4. More specifically, the plastic material is disposed between a pair of opposed heating elements 22, and a thin sheet of heat insulating material 24 is inserted within the fold of the strip 18. The heating elements 22 are moved into contact with the exposed outer surfaces at the ends of the wall panels to melt the three overlapping layers of plastic material between the heating elements 22 and each side of the insulating sheet 24 so that such layers of plastic material will be bonded together along seal lines 26 (see FIGS. 8 and 9), it being noted that the insulating sheet 24 prevents bonding together of the separated three-layer configurations. For reasons explained in greater detail below, it is preferable that the heating elements 22 be arranged to form the aforesaid seal lines 26 so that they extend across the corners of the gusset in angular relationship to the side edges of the wall panels 14, 14' and the top edges represented by the fold lines 16, 16', each such seal line 26 preferably lying at a 45 degree (45°) angle to the respective edges between which they extend. To complete the bag, the adjacent side edges of the overlapping wall panels 14, 14' are joined together at seal lines 28 extending along the length thereof (see FIGS. 8 and 9), preferably by conventional heat-sealing equipment designed for this purpose (not shown).

Figure 9:
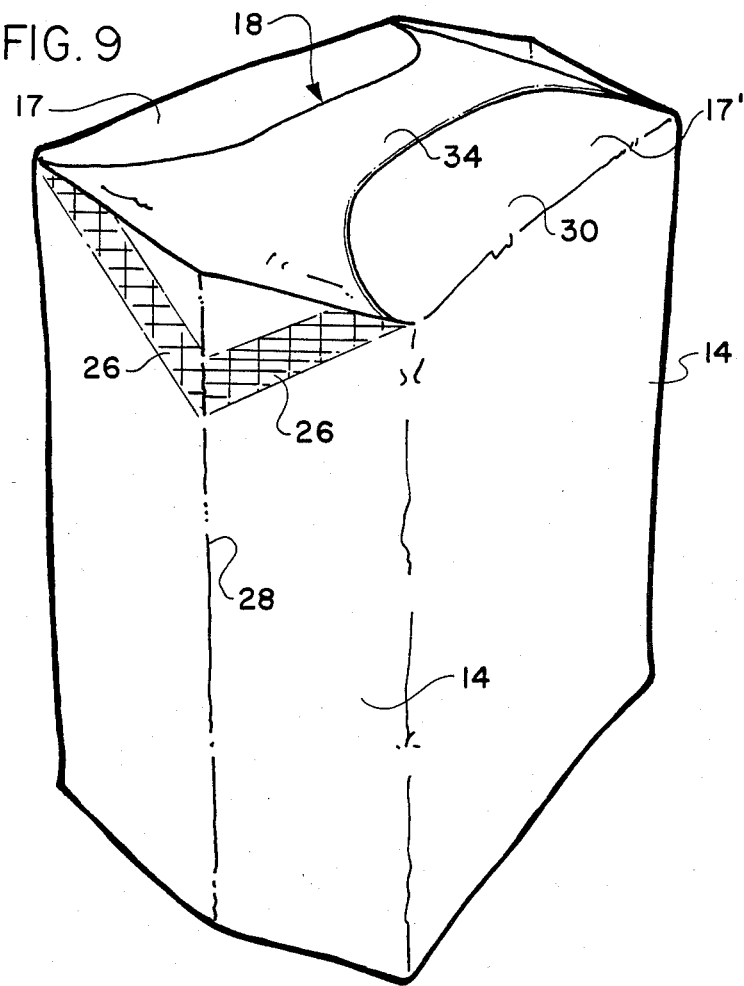
FIG. 9 is a perspective view illustrating a bag embodying the present invention and filled with merchandise.

The completed bag may then be loaded with merchandise through its open end, such merchandise causing the bag to assume a generally rectangular shape defined and limited by the dimensions of the bag. This loading of the bag will, of course, result in the wall panels 14 and 14' assuming an open, tubular configuration as illustrated in FIG. 9 and having a flat end panel 30 at the closed end thereof, such end panel 30 being formed by the previously inwardly tucked gusset walls 17, 17' described above. Moreover, the strip 18 will now extend across the end panel 30 and will lie immediately adjacent to the surface of the end panel 30. The open ends of the wall panels 14, 14' may then be closed or sealed in any suitable manner to close the bag about the contained merchandise.

In looking at FIG. 9, it will be noted that the strip 18 now forms a handle extending across the top panel in close proximity thereto to provide a neat appearance, and to avoid the above-described drawbacks associated with known bag handles in the form of extended loops. However, this close proximity of the handle strip 18 to the end panel 30 does not interfere in any significant manner with the ability of a user to readily insert the fingers of the hand between the handle strip 18 and the end panel 30, particularly since the flaccid nature of the material forming the handle strip 18 and the bag itself lends sufficiently flexibility to permit such insertion. In this regard, the handle strip 18 of the preferred embodiment of the present invention has a configuration (see FIG. 7) such that its opposite end portions 32 have a greater width than the contoured intermediate portion 34 of the handle strip, whereby the reduced width of the intermediate portion 34 is less than the width of the end panel 30 across which it extends to facilitate the insertion of fingers therebetween as shown in FIG. 9, while the wider end portions 32 provide added strength to the bag because the seal lines 26 extend across the entire increased width of the end portions 32 and the corresponding dimensions of the inwardly folded gusset walls 17, 17'. It will be understood, however, that the handle strip 18 could be formed, if desired, without the contoured intermediate portion 34, and that the width of the handle strip 18, including its end portions 32, could be less than the corresponding depth of the gusset if the added strength obtained from equal dimensions is not necessary. It will be noted, also, that handle strip 18, which is folded along its centerline during the forming of the bag, will be opened to a flat disposition across the end panel 30 by the lateral forces imposed on the gusset walls 17, 17' during loading of the merchandise into the bag.

When the bag shown in FIG. 9 is carried by its handle strip 18, it will be appreciated that the load imposed by the weight of the merchandise in the bag is borne at the seal lines 26. By forming these seal lines 26 at 45 degree (45°) angles to the side edges 28 and the fold lines 16, 16', they will form V-shaped seal lines at the sides of the bag as shown in FIG. 9, and these V-shaped seal lines will serve to evenly distribute the load of the merchandise along the entire width of the side of the bag. Additionally, it will be noted that the seal lines 26 join the wall panels 14, 14', the gusset walls 17, 17' and the ends 32 of the handle strip 18 together as one integral unit, whereby the handle strip 18 is secured directly to the wall panels 14, 14'.

Figure 10:
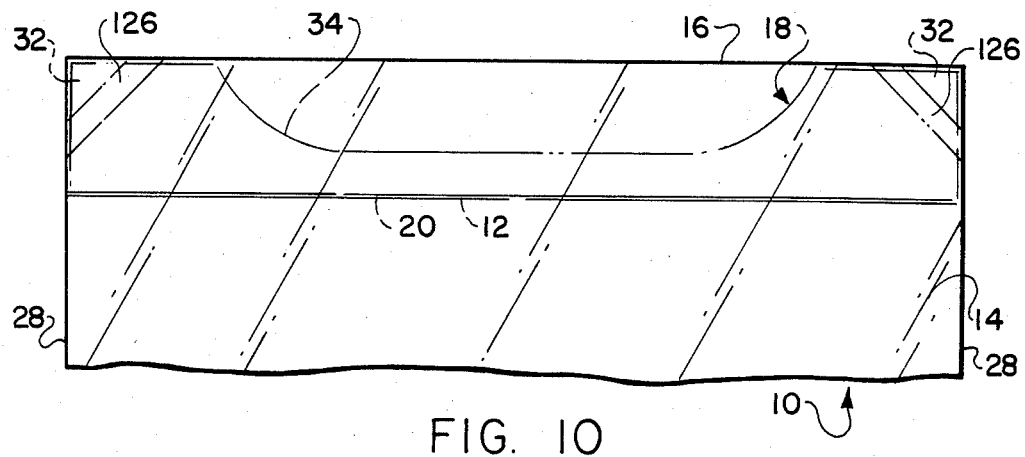
FIG. 10 is a plan view similar to FIG. 8 illustrating an alternate embodiment of the present invention.
Figure 11:
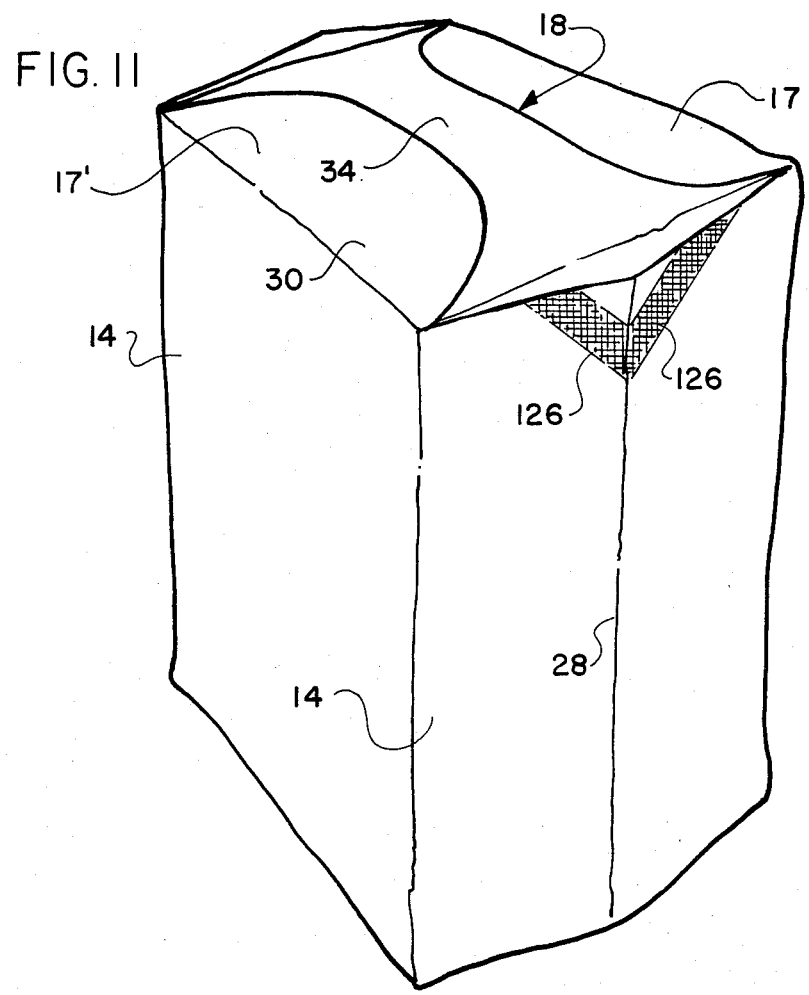
FIG. 11 is a perspective view, similar to FIG. 9, illustrating the alternate embodiment of the present invention shown in FIG. 10.

An alternate embodiment of the bag of the present invention is shown in FIGS. 10 and 11, such alternate embodiment being identical to the bag shown in FIGS. 1-9, except for the location of the seal lines, which are identified by the reference numeral 126 in FIGS. 10 and 11, and except for the provision of perforations in the handle strip 18, indicated at 102 and more fully described hereinafter. Looking at FIG. 10, it will be noted that the seal lines 126 extend diagonally at a forty-five degree (45°) angle from the side edges of the wall panels 14, 14', but they extend from such side edges at a point intermediate the top fold line 16 and the tucked fold lines 12 and 20, rather than extending from a point adjacent the top fold lines 12 and 20 as in the first above-described embodiment. By locating the seal line 126 at this location, it will be noted that there is a small portion of the handle strip 18 located beneath the seal line 126 as indicated at 100 which is joined to the wall panels 14, 14' but not to the gusset walls 17, 17'. The handle strip 18 is provided with V-shaped perforation lines 102 which extend convergingly from the fold line 20 to the seal line 126 at the small portion 100 at each handle strip end 32. As a result, when the bag is filled with merchandise and assumes its rectangular shape as shown in FIG. 11, the ends 32 of the handle strip 18 will, at least initially, remain between the wall panels 14, 14' and the gusset walls 17, 17' so that the handle strip 18 will extend across the end panel 30 in close proximity thereto to provide the same neat appearance as is the case with the embodiment shown in FIGS. 1-9 and described above. However, when a hand is inserted beneath the handle strip 18 to lift or carry the bag, the handle strip 18 will tear neatly along the perforation line 102 so that the small portion 100 of the handle strip end portions 32 will be pulled outwardly to extend slightly the overall length of the handle strip 18, thereby making it easier to fully insert the hand between the handle strip and the end panel 30. In obtaining this added convenience in carrying the bag, some sacrifice is made to the strength of the handle strip connection because the V-shaped seal lines will not extend across the entire width of the bag. Accordingly, it will be understood that bags of the type shown in FIGS. 10 and 11 will ordinarily be used where the weight of the merchandise contained therein is lighter and where it is desired to increase somewhat the length of the handle strip 18, whereas bags of the type shown in FIGS. 8 and 9 will ordinarily be used where the weight of the contained merchandise dictates that maximum handle strip strength be utilized.

Figure 12:
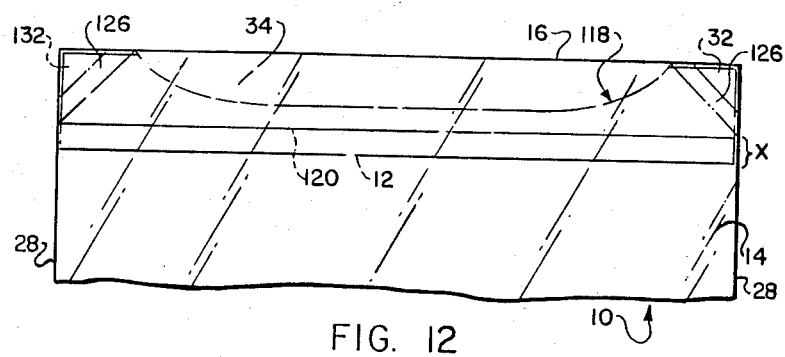
FIG. 12 is a plan view similar to FIG. 8 illustrating another alternate embodiment of the present invention.
Figure 13:
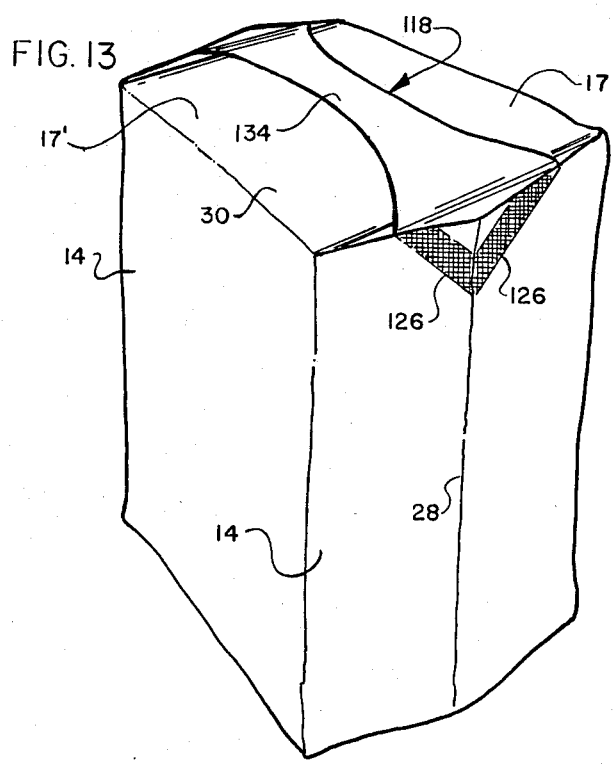
FIG. 13 is a perspective view, similar to FIG. 9, illustrating the alternate embodiment of the present invention shown in FIG. 12.
Figure 10:
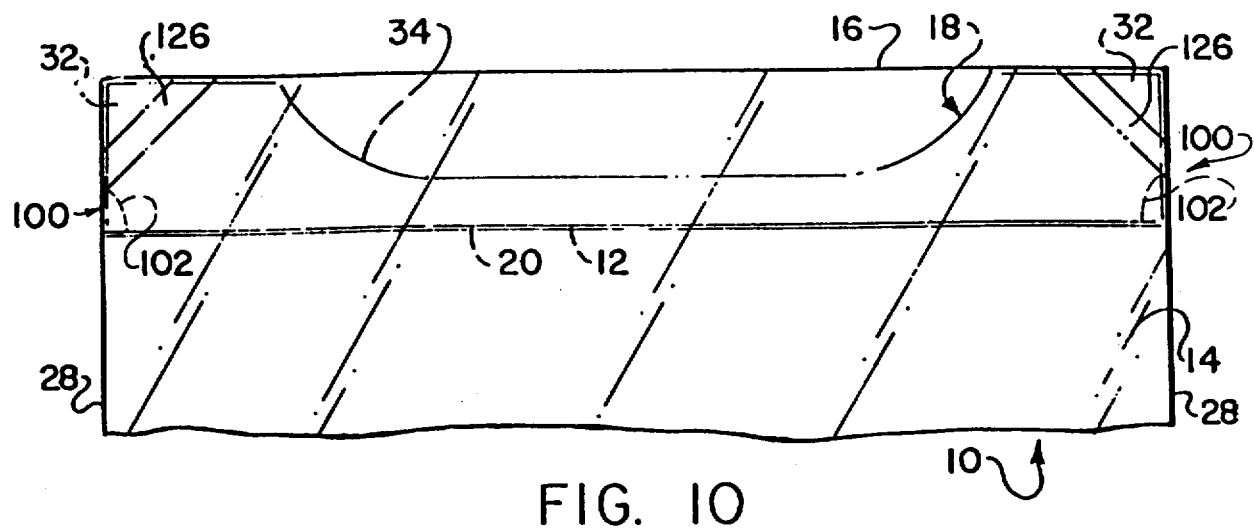

Another alternate embodiment of the bag of the present invention similar to that of FIGS. 10 and 11 is shown in FIGS. 12 and 13. This alternate embodiment is identical to the bag of FIGS. 1-9 except for the shape and relative disposition of the handle strip, identified by reference numeral 118 in FIGS. 12 and 13, and except for the location of the seal lines, identified by reference numeral 126, which are formed as in the bag of FIGS. 10 and 11. The handle strip 118 has a width at its ends 132 that is substantially equal to the combined length of the lengthwise portions of the gusset walls 17, 17' along which the seal lines 126 extend. The intermediate portion 134 of the handle strip 118 is contoured to a narrowed width at each lengthwise side at spacings from the ends 132 equal to the width of the widthwise portions of the gusset walls 17, 17' across which the seal lines extend. In the method of forming the bag of FIGS.

12 and 13, the folded handle strip 118 is inserted into the gusset only to an extent such that the lengthwise side edges of the handle strip 118 at its ends 132 are flush with the gusset fold lines 16, 16'. The fold line 120 of the handle strip 118 is therefore spaced from the gusset fold line 12 by a dimension X equal to the spacing therefrom at which the seal lines 126 are formed. In the finished bag filled to assume its rectangular shape, this spacing X causes the handle strip 118 to extend across the end panel 30 at a corresponding spacing X therefrom to permit easy insertion of a hand beneath the handle strip 118 to lift or carry the bag to provide the same added convenience as achieved by the perforations of the bag of FIGS. 10 and 11. The narrowed contour of the handle strip 118 causes the resultant which of the handle strip 118 in the filled bag to correspond to the width of the seal lines 126 without any excess unsealed handle width so that the handle strip assumes a desirable neat, flattened appearance. As will be understood, this same narrowed contour may be provided with the handle strip 18 used in the bag of FIGS. 10 and 11.

It is contemplated that in certain circumstances it may not necessarily be considered disadvantageous to provide the handle strip at a slight extension outwardly from the end panel of the bag, such as where the bags of the present invention may not normally be stacked for storage or display or where it is desired to draw customers' attention to the handle of the bags. The bag of FIGS. 12 and 13 is accordingly provided for such situations. Nevertheless this embodiment of the bag of the present invention avoids the aforementioned disadvantages of the conventional bags wherein relatively long, looping extended handles are utilized. Thus, the spacing X may be varied to regulate the degree to which the handle strip 118 extends and can be selected to be relatively small so that the handle strip 118 extends only as far as necessary to permit insertion of a hand under the handle strip 118 so that it is not likely to be inadvertently engaged by customers, workers, shopping carts or equipment and may therefore still permit stacking of the bags. The neat, flattened appearance of the handle strip 118 aids in avoiding such problems characteristic of conventional bags and further avoids their typically unsightly appearance. Furthermore, the bags of the present invention do not require significant modification of conventional bag making equipment as explained below whereby the method and cost of making the bags of FIGS. 12 and 13 is not significantly greater than ordinary gusseted bags.

One of the virtues of the bag of the present invention is the fact that it can be made without significantly modifying existing, conventional bag-making equipment. Thus, conventional equipment is commonly in use which folds a continuous sheet of thin plastic material as shown in FIGS. 1 and 5, and conveys the folded sheet to a thin disc which is disposed to gradually tuck the end portions of the wall panels therebetween as shown in FIGS. 2 and 6, after which, on the assembly line, heat sealing equipment is used to seal the overlapping layers forming the gusset and to cut and seal the side edges of the wall panels. To make the bag of the present invention, it is simply necessary to add accessory equipment which will centerfold the handle strips from a roll of material in similar fashion to conventional bag material unwinding and centerfolding equipment, cut the handle to a desired shape, perforate it if necessary, and, in continuous length, feed the material to the existing gusset-forming thin disc which simultaneously tucks the end portions of the wall panels and inserts the folded handle strip 18 within the tuck for subsequent bonding thereat by conventional heat sealing equipment. The bag material with the inserted handle strip is then cut to a correct width at seal lines 28 using the same conventional side weld heat cutting equipment presently employed to cut conventional bags.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A bag for receiving and containing merchandise and the like, said bag comprising a sheet of flaccid material folded along a fold line to provide two juxtaposed wall panels having adjacent side edges joined to one another, said fold line being tucked inwardly between said juxtaposed wall panels forming top edges along said wall panels to form a gusset consisting of the overlapping portions of said wall panels, a separate strip of material folded along a fold line extending along the length thereof to provide side portions on opposite sides of said fold line, said strip being disposed within said gusset to extend across the width thereof with said fold line of said strip lying most closely adjacent to said inwardly tucked fold line of said sheet of flaccid material and with said side portions of said strip extending away from said inwardly tucked fold line to be respectively adjacent said overlapping portions of said wall panels, and seal means joining the side portions of said strip of material at each end thereof to the respective adjacent overlapping portions of said wall panels at seals formed in a V-shaped pattern defined by lines extending diagonally between said side edges and said top edges of said wall panels whereby the filling of said bag with merchandise will result in said wall panels assuming an open disposition having an end panel formed by said gusset and with said strip extending across said end panel and adjacent thereto in an unfolded flattened condition to provide a handle for lifting said carrying said bag with the weight of said merchandise being borne at said seals.

2. A bag as defined in claim 1 and characterized further in that said wall panels are rectangular in shape with said top edges between the side edges thereof in perpendicular relation thereto, and in that said pattern-defining lines extend at an angle of essentially forty-five degrees with respect to both said side edges and said top edges.

3. A bag as defined in claim 2 and characterized further in that each said pattern-defining line extends from said side edges of said wall panels at a point on said side edges adjacent to said fold line of said strip.

4. A bag as defined in claim 3 and characterized further in that said fold line of said strip is disposed immediately adjacent said inwardly tucked fold line of said sheet of flaccid material.

5. A bag as defined in claim 4 and characterized further in that the unfolded width of said strip at its ends is substantially equal to the combined length of said overlapping portions of said wall panels, whereby load imposed on said seals will be evenly distributed along said pattern-defining lines across the width of the bag when carried by said strip.

6. A bag as defined in claim 3 and characterized further in that said fold line of said strip is disposed at a predetermined spacing from said inwardly tucked fold line of said sheet of flaccid material.

7. A bag as defined in claim 2 and characterized further in that each said pattern-defining line extends from said side edge of said wall panels at a point intermediate said fold line of said strip and said top edge of said wall panels.

8. A bag as defined in claim 7 and characterized further in that said fold line of said strip is disposed immediately adjacent said inwardly tucked fold line of said sheet of flaccid material.

9. A bag as defined in claim 8 and characterized further by perforation lines extending in said side portions of said strip from each said intermediate point to said fold line of said strip for separation of said strip from the portion of said wall panel side edges between said intermediate point and said fold line of said strip when a predetermined lifting force is exerted on said strip to prevent concentration of said force at said wall panel side edge portions.

10. A bag as defined in claim 9 and characterized further in that the unfolded width of said strip at its ends is substantially equal to the combined length of said overlapping portions of said wall panels, whereby load imposed on said seals will be evenly distributed along said pattern-defining lines across the corresponding width of the bag when carried by said strip.

11. A bag as defined in claim 2 and characterized further in that said strip is shaped to provide said opposite ends thereof with a greater width than the intermediate portion thereof between said opposite ends.

12. A bag as defined in claim 1 and characterized further in that said sheet of material and said strip of material both consist of a heat sensitive plastic material, and in that said seal means consists of a heat seal formed along said pattern-defining lines.

13. A method of forming a bag having a handle therefor, said method including the steps of:
  (a) folding a sheet of flaccid material to a disposition at which it forms into juxtaposed wall panels having two side edges, a closed edge formed by said fold, and an open bottom edge;
  (b) tucking said closed edge inwardly between said juxtaposed wall panels forming top edges along said wall panels to form a gusset consisting of the overlapping portions of said wall panels;
  (c) folding a separate strip of material along a fold line extending along the length of said strip to provide side portions on opposite sides of said fold line;
  (d) inserting said folded strip of material into said gusset to extend across the width thereof with said fold line of said strip of material disposed most closely adjacent to said closed edge of said sheet tucked between said wall panels and with said side portions of said strip extending away from said closed edge respectively adjacent said overlapping portions of said wall panels;
  (e) joining together, at each side of said gusset, the side portions of said strip at each end thereof to the respective adjacent overlapping portions of said wall panels at seals formed in a V-shaped pattern defined by lines extending diagonally between said side edges and said top edges of said wall panels; and
  (f) joining together the adjacent side edges of said wall panels, whereby the filling of said bag with merchandise will result in said wall panels assuming an open disposition having an end panel formed by said gusset and with said handle strip extending across said end panel and adjacent thereto in an unfolded flattened condition to provide a handle for lifting and carrying said bag with the weight of said merchandise being borne at said seals.

14. A method of forming a bag as defined in claim 13 and characterized further in that said sheet of material and said strip of material consist of a heat sensitive plastic material, and by the further step of inserting a sheet of insulating material between the side portions of said strip of material within said gusset, and heat sealing said side portions of said strip of material to the adjacent two overlapping layers of said sheet of material with said insulating sheet preventing said side portions of said strip from being sealed to one another.

15. A method of forming a bag as defined in claim 13 and further characterized in that said side edges of said wall panels are parallel, said folding and tucking cause said top edges of said wall panels to be oriented in perpendicular relation to said side edges, and said joining together of said strip side portions and said wall panel overlapping portions includes forming said seals to orient said pattern-defining lines at an angle of essentially forty-five degrees with respect to both said side edges and said top edges.

16. A bag as defined in claim 1 and characterised further in that said seals are formed as continuous seal lines extending diagonally between said side edges and said top edges of said wall panels along said pattern-defining lines.

* * * * *

UNITED STATES PATENT OFFICE
CERTIFICATE OF CORRECTION

Patent No. 4,539,705        Dated September 3, 1985

Inventor(s) Patrick A. Baines

It is certified that error appears in the above-identified patent and that said Letters Patent are hereby corrected as shown below:

Column 2, line 9, delete "stick" and insert therefor —slick— .

Column 7, line 15, delete "which" and insert therefor —width— .

Column 8, line 43, delete "said carrying" and insert therefor —and carrying— .

Fig. 10 should appear as shown on the attached sheet.

Signed and Sealed this

Seventh Day of January 1986

[SEAL]

Attest:

DONALD J. QUIGG

Attesting Officer        Commissioner of Patents and Trademarks